(12) United States Patent
Amaki et al.

(10) Patent No.: US 12,554,445 B2
(45) Date of Patent: Feb. 17, 2026

(54) IMAGE FORMING APPARATUS THAT DISPLAYS INFORMATION ABOUT A CONSUMABLE

(71) Applicant: FUJIFILM Business Innovation Corp., Tokyo (JP)

(72) Inventors: Marie Amaki, Yokohama (JP); Atsushi Mikami, Yokohama (JP); Tomoya Imai, Yokohama (JP); Daichi Inoue, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 476 days.

(21) Appl. No.: 17/881,687

(22) Filed: Aug. 5, 2022

(65) Prior Publication Data

US 2023/0315358 A1  Oct. 5, 2023

(30) Foreign Application Priority Data

Mar. 29, 2022 (JP) ................................. 2022-054136

(51) Int. Cl.
 *G06F 3/12* (2006.01)
(52) U.S. Cl.
 CPC .......... *G06F 3/1235* (2013.01); *G06F 3/1203* (2013.01); *G06F 3/121* (2013.01); *G06F 3/1221* (2013.01)
(58) Field of Classification Search
 None
 See application file for complete search history.

(56) References Cited

U.S. PATENT DOCUMENTS

| | | |
|---|---|---|
| 8,610,918 B2 | 12/2013 | Kaneko |
| 10,771,640 B2 | 9/2020 | Tachibana |
| 2009/0097061 A1 | 4/2009 | Kaneko |
| 2019/0312986 A1 | 10/2019 | Tachibana |

FOREIGN PATENT DOCUMENTS

| | | |
|---|---|---|
| JP | H111052 A | 1/1999 |
| JP | 2003-241584 A | 8/2003 |
| JP | 2010-156737 A | 7/2010 |
| JP | 4974837 B2 | 7/2012 |
| JP | 2019-184797 A | 10/2019 |

OTHER PUBLICATIONS

May 19, 2023 Extended Search Report issued in European Patent Application No. 22193069.6.
Nov. 11, 2025 Office Action issued in Japanese Patent Application No. 2022-054136.

*Primary Examiner* — Lennin R Rodriguezgonzalez
(74) *Attorney, Agent, or Firm* — Oliff PLC (57) ABSTRACT

An image forming apparatus includes a processor configured to: detect the presence or absence of a malfunction and opening and closing of a covering; and cause a display device to display information about a consumable such that a reset operation of a counter that is set regarding the consumable is receivable in a case where a predetermined malfunction does not occur, and a covering related to the consumable is opened and is subsequently closed.

16 Claims, 8 Drawing Sheets

IMAGE FORMING APPARATUS THAT DISPLAYS INFORMATION ABOUT A CONSUMABLE

CROSS-REFERENCE TO RELATED APPLICATIONS

This application is based on and claims priority under USC 119 from Japanese Patent Application No. 2022-054136 filed Mar. 29, 2022.

BACKGROUND

(i) Technical Field

The present disclosure relates to an image forming apparatus and a non-transitory computer readable medium.

(ii) Related Art

An image forming apparatus has a mechanism of notifying a user of the replacement time of a consumable. In an example, a state of the consumable is monitored by using, for example, a sensor, and the user is notified of detection or a state that needs replacement. In another example, a replacement recommendation time is determined, and the replacement time is identified based on last replacement date and time and is reported. In the latter case, when the component is replaced, a counter that counts elapsed date and time until the replacement recommendation time or the number of times a job is carried out need to be reset by, for example, a user operation.

Japanese Patent No. 4974837 discloses that a service mode and an operator maintenance mode in which a component is replaced are prepared as the operation modes of an image forming apparatus, where a replacement component list is displayed in the modes that are changed from a normal mode by a user operation, and a counter regarding a component that is selected from the replacement component list on the display is cleared.

Japanese Unexamined Patent Application Publication No. 2019-184797 discloses an image forming apparatus that reports a guidance for replacing a component in the case where an event that needs the replacement of the component is detected and that ends the report of the guidance in conditions: an opened covering is closed for the replacement, and an input for reporting the completion of the replacement is received.

Japanese Unexamined Patent Application Publication No. 2010-156737 discloses an image forming apparatus that displays a button for registering a report that represents a consumable is replaced with a new one when a front cover is opened, that resets a counter value that represents the amount of the used consumable by using a button operation, and that performs an image stabilizing process on the new consumable. When the front covering of the apparatus is closed after the button operation, the image stabilizing process is performed even with a standby job queuing at this time, and the standby job is subsequently carried out. When the front covering is closed, the button operation is prohibited.

SUMMARY

As for a consumable a state or which is not detectable, a counter that counts, for example, elapsed date and time until the replacement recommendation time or the number of times a job is carried out is reset by, for example, a user operation when a component is replaced. However, if the reset operation of the counter is to be received with a covering of the apparatus opened or in a special state such as a mode that is changed by an intentional operation, and if the reset operation is not correctly performed due to, for example, the oversight of resetting or an error of a target to be reset, and the state returns to a normal state, the replacement recommendation time is not correctly identified.

Aspects of non-limiting embodiments of the present disclosure relate to an image forming apparatus that enables the oversight or error of the reset operation of a counter when a component is replaced to be reduced in a manner in which information about a consumable is displayed based on a state of the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: detect the presence or absence of a malfunction and opening and closing of a covering; and cause a display device to display information about a consumable such that a reset operation of a counter that is set regarding the consumable is receivable in a case where a predetermined malfunction does not occur, and a covering related to the consumable is opened and is subsequently closed.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will hereinafter be described with reference to the attached drawings.

Apparatus Structure

Figure 1:
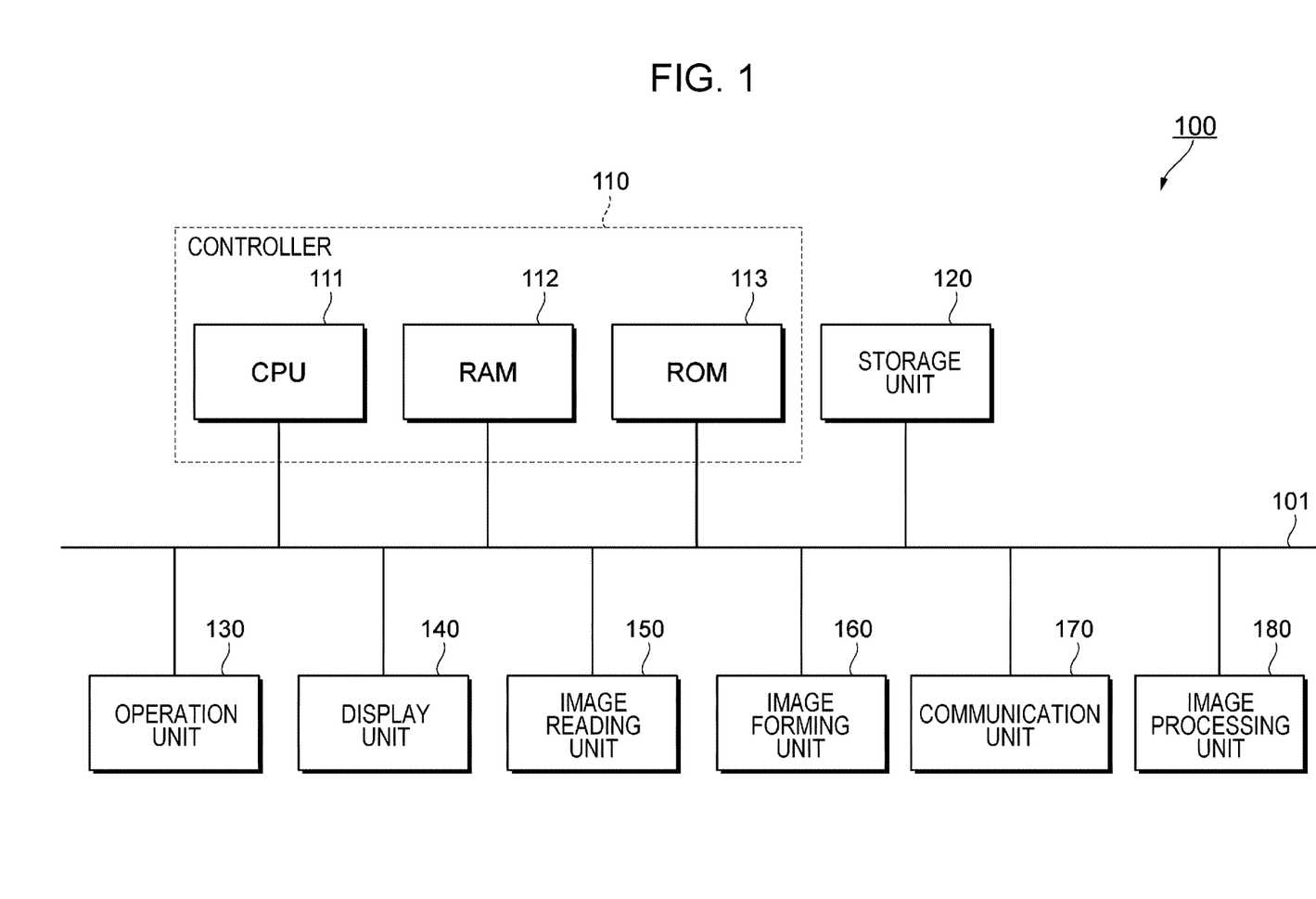
FIG. 1 illustrates an example of the structure of an image forming apparatus according to an exemplary embodiment.

FIG. 1 illustrates the structure of an image forming apparatus according to the present exemplary embodiment.

An image forming apparatus 100 includes a controller 110, a storage unit 120, an operation unit 130, a display unit 140, an image reading unit 150, an image forming unit 160, a communication unit 170, and an image processing unit 180. These functional units are connected to a bus 101 and transmit and receive data via the bus 101.

The controller 110 controls the functional units described above in the image forming apparatus 100. The controller 110 is a functional unit that performs various data processes. The controller 110 includes a central processing unit (CPU) 111 corresponding to an arithmetic unit and a random access memory (RAM) 112 and a read only memory (RPM) 113 that are storage components. The RAM 112 is a main memory and is used as a work memory when the CPU 111 performs arithmetic processing. The ROM 113 stores a program and data such as set values that are prepared in advance. The CPU 111 directly reads the program and the data from the ROM 113 and performs processing. A program and data are stored also in the storage unit 120. The CPU 111 reads the program that is stored in the storage unit 120 into the RAM 112 and runs the program.

According to the present exemplary embodiment, the CPU 111 of the controller 110 reads and runs the program for performing various functions described later. Examples of the functions that are performed according to the present exemplary embodiment include a function of display control on a user interface (UI) screen in operation modes described later, a function of receiving an operation by using the UI screen, and a counter function that is used for calculating the replacement time or replenishment time for a consumable. These functions will be described in detail later. In the following description, the word "replacement" includes the replacement of the consumable (for example, a photoconductor drum) that needs to be replaced depending on a state and the replenishment of a consumable (for example, toner or paper) that needs to be replenished depending on a state. In some cases, however, the replacement and replenishment are distinguished, and the phrase "replacement and replenishment" or "replacement or replenishment" is described.

The storage unit 120 is a functional unit that stores the program that is performed by the CPU 111 and the data as described above and that stores various kinds of data generated by various operations such as the data of an image that is read by the image reading unit 150. For example, the storage unit 120 is operated by using a storage device such as a magnetic disk device or a solid state drive (SSD).

The operation unit 130 is a functional unit that receives an operation of a user. For example, the operation unit 130 includes a hardware keyboard or a touch sensor that outputs a control signal depending on the position of a press or a touch of, for example, a finger. A touch screen into which a touch sensor and a liquid-crystal display that serves as the display unit 140 are incorporated may be included.

The display unit 140 is a functional unit that displays images such as an information image that provides the user with various kinds of information, a preview image for an image to be read or outputted, or an operation image for the operation of the user. For example, the display unit 140 includes a liquid-crystal display. A combination of the display unit 140 and the operation unit 130 described above may be used as a user interface unit for the user to input and output information from and to the image forming apparatus 100.

The image reading unit 150 is a functional unit that optically reads an image on a document. Examples of a method of reading the image include a CCD method in which reflection light of light that is radiated from a light source to the document is shrunk by a lens and is received by a charge coupled device (CCD) and a CIS method in which reflection light of light that is sequentially radiated from a light emitting diode (LED) light source to the document and is received by a contact image sensor (CIS).

The image forming unit 160 is a functional unit that forms an image based on image data on a recording material such as paper by using an image formation material. An example of a method of forming the image on the recording material is an electrophotographic system that uses toner as the image formation material, that transfers toner that is attached to a photoconductor member to the recording material, and that forms the image.

The communication unit 170 is a functional unit that transmits and receives an instruction and data to and from an external device. The communication unit 170 is an interface that is compatible with a system of communication with the external device. Connection with the external device may be connection via a network or direct connection. A communication line may be a wired line or a wireless line.

The image processing unit 180 is a functional unit that includes a processor corresponding to an arithmetic unit and a work memory and that performs image processing such as color correction or gradation correction on an image that is represented by image data. The CPU 111 of the controller 110 may double as the processor. The RAM 112 of the controller 110 may double as the work memory.

Operation Mode

The operation modes of the image forming apparatus 100 according to the present exemplary embodiment will be described. The operation modes of the image forming apparatus 100 include a normal mode that is an example of a first operation mode and a consumable replacement mode that is an example of a second operation mode. The normal mode is the operation mode when the image forming apparatus 100 is in a normal operation state. For example, the normal operation state is a state in which power is on, the components of the image forming apparatus 100 start up, and normal use such as image printing or reading becomes ready. The consumable replacement mode is the operation mode in which an operation required depending on the replacement of a consumable is received.

The consumable is degraded or consumed through the use of the image forming apparatus 100 and accordingly needs to be replaced or replenished in an appropriate time. For this reason, the image forming apparatus 100 has a mechanism of notifying a user of the replacement time of the consumable. In an example of this kind of mechanism, a state of the consumable is monitored by using, for example, a sensor, and the user is notified of detection of a state that needs replacement or replenishment. For example, the user notified by using a method in which a message for prompting the user to replace the consumable is displayed on the display unit 140. In this case, when the consumable is replaced or replenished, a monitoring unit such as a sensor detects this, and notification to the user is dismissed.

As for a consumable, the state that needs replacement or replenishment cannot be detected if the monitoring unit described above is not provided. For this kind of the consumable, a time (referred to as a "replacement recommendation time") in which replacement or replenishment is recommended is determined depending on the kind of the consumable. A time (referred to as a "replacement time") that needs replacement or replenishment is identified for the consumable depending on progression information after date and time (referred to as "last replacement date and time") at which the consumable is replaced or replenished at last. The progression information used to identify the replacement time of the consumable.

The replacement recommendation time and the progression information are set depending on the kind of the consumable. For example, as for a consumable that is degraded or reduced over time, the replacement recommendation time is defined by using an elapsed time after the consumable is replaced. An elapsed time after the last replacement date and time is used as the progression information. As for a consumable that is degraded or reduced depending on a job that is carried out by the image forming apparatus 100, the replacement recommendation time is defined by using the number of times the job is carried out after the consumable is replaced. The number of times the job is carried out after the last replacement date and time is used as the progression information. Such progression information is merely described by way of example, and various kinds of information may be used as the progression information depending on the kind of the consumable. The progression information about consumables is calculated by using a method that is determined depending on the kinds of the consumables.

The replacement time of each consumable is a time at which the progression information after the last replacement date and time of the consumable reaches the replacement recommendation time. As for each consumable, the image forming apparatus 100 notifies the user of the replacement time of the consumable. For example, the user is notified by, for example, using a method in which a message for prompting the user to replace the consumable is displayed on the display unit 140.

As for the consumable for which the monitoring unit is not provided as described above, a counter that counts the progression information until a next replacement time of the consumable needs to be reset after the consumable is replaced or replenished. For example, the counter is manually reset by the user who replaces the consumable. According to the present exemplary embodiment, the image forming apparatus 100 has the consumable replacement mode to reduce the oversight or error of the reset operation of the counter that is performed by the user.

The normal mode is changed into the consumable replacement mode in the case where a predetermined condition is satisfied when a covering of a housing of the image forming apparatus 100 is opened and closed. Examples of conditions under which the normal mode is changed into the consumable replacement mode include the occurrence of a malfunction related to a consumable in the image forming apparatus 100 when a covering at a position at which the consumable is located is opened, the replacement time of a consumable is near, and nonoccurrence of a malfunction other than the malfunction related to the consumable. An example of the malfunction other than the malfunction related to the consumable is paper jam. In the case where the covering of the image forming apparatus 100 is closed when this condition is satisfied, the image forming apparatus 100 enters the consumable replacement mode from the normal mode. After the image forming apparatus 100 enters the consumable replacement mode, a specific UI screen is displayed on the display unit 140, information about, for example, the position of the consumable is displayed by using the UI screen, and the reset operation of the counter that is performed by the user for counting the progression information about the consumable is receivable. The UI screen will be described in detail later.

In the case where the covering of the image forming apparatus 100 is closed when the condition described above is not satisfied, the image forming apparatus 100 does not enter the consumable replacement mode from the normal mode. In the normal mode, a state in which the covering of the image forming apparatus 100 is opened corresponds to a malfunction, and a notification screen for notifying the user of the position of the opened covering is displayed on the display unit 140. When the covering is closed, the notification screen is cleared. For this reason, when the covering of the image forming apparatus 100 is closed, the display unit 140 displays different screens depending on whether the mode is changed into the consumable replacement mode.

When the reset operation of the counter that counts the progression information about the consumable is performed by using the UI screen that is displayed on the display unit 140 after the mode is changed into the consumable replacement mode, the counter is reset, and the mode of the image forming apparatus 100 returns to the normal mode from the consumable replacement mode. Even when the reset operation is not performed, the mode of the image forming apparatus 100 returns to the normal mode from the consumable replacement mode due to the occurrence of a predetermined phenomenon that occurs in the image forming apparatus 100. Phenomena that trigger the return to the normal mode (referred to as a "return trigger") may be various phenomena that need an operation in the normal mode when the phenomena occur. Examples thereof may include an instruction for carrying out a job in the normal mode such as image printing, powering off the image forming apparatus 100, changing the mode of the image forming apparatus 100 into a power saving mode, and a predetermined time elapsed while the reset operation is not performed. These phenomena are examples. The phenomena may be set as the return trigger in consideration of various scenes in which the consumable replacement mode is to be changed into the normal mode.

Example of Display of UI Screen

The UI screen that is displayed on the display unit 140 of the image forming apparatus 100 in the consumable replacement mode will be described. According to the present exemplary embodiment, an image (referred to as an "apparatus image") of the appearance of the image forming apparatus 100 is displayed on the display unit 140, and the position of the covering that is opened and closed is indicated. An image (referred to as a "consumable image") of a consumable in the housing that is covered by the covering is displayed, and an operation of selecting the counter to be reset is received on the consumable image. In the following description including a situation in which the normal mode is changed into the consumable replacement mode, display screens in several scenes on the display unit 140 are referred. In the following description, the monitoring unit described above is not provided for the consumable.

Figure 2:
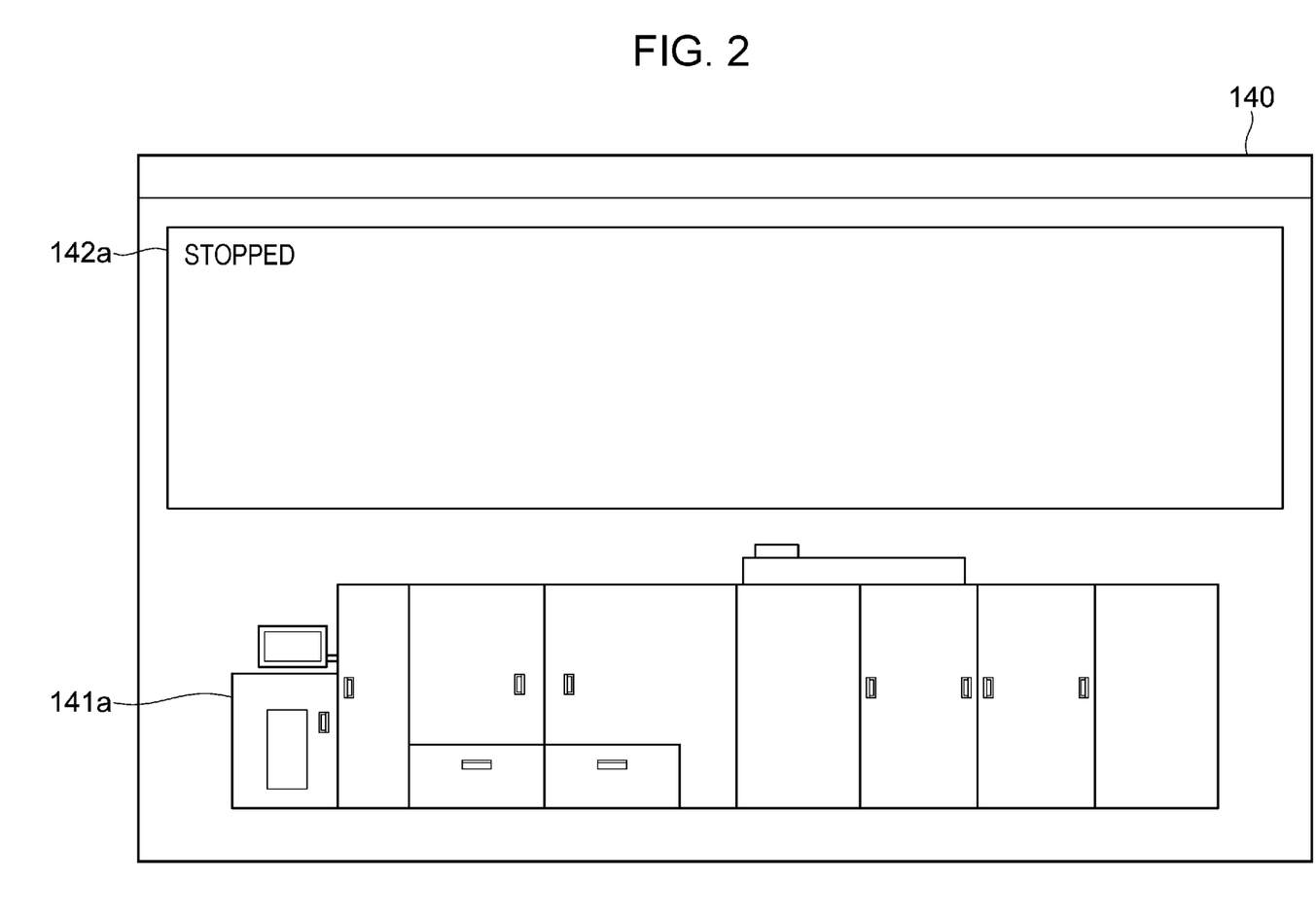
FIG. 2 illustrates an example of a screen on which the image forming apparatus that stops in a normal mode is displayed.

FIG. 2 illustrates an example of a screen on which the image forming apparatus 100 that is in a stop state in the normal mode is displayed. FIG. 2 illustrates an apparatus image 141a of the image forming apparatus 100 and a text region 142a. In the text region 142a, a message that "STOPPED" representing a state of the image forming apparatus 100 is displayed. The apparatus image 141a illustrated in FIG. 2 is an image of the image forming apparatus 100 viewed in front of a front side.

Figure 3:
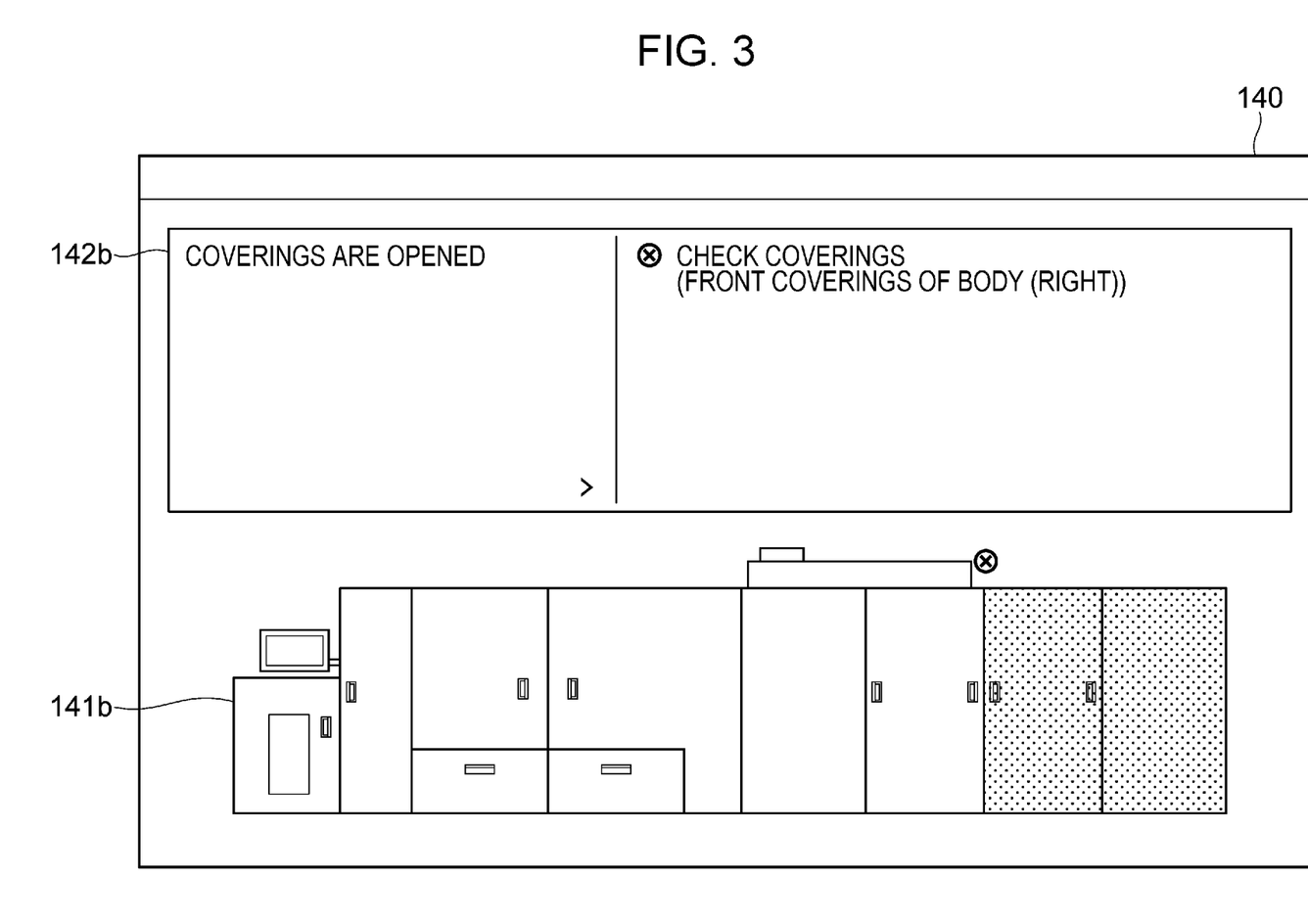
FIG. 3 illustrates an example of a screen on which the image forming apparatus with coverings opened in the normal mode is displayed.

FIG. 3 illustrates an example of a screen on which the image forming apparatus 100 with coverings opened in the normal mode is displayed. FIG. 3 illustrates an apparatus image 141*b* in which the positions of opened coverings are indicated and a text region 142*b*. In the text region 142*b*, a message that "COVERINGS ARE OPENED" representing a state of the image forming apparatus 100 is displayed.

In the description as for the image forming apparatus 100, two right-hand coverings are opened when viewed in the same direction as the apparatus image 141*a* in FIG. 2. The coverings in the apparatus image 141*b* in FIG. 3 are displayed by using a color that differs from that of the other portion (in the figure, these are illustrated by hatching). In FIG. 3, a mark (a cross mark that is surrounded by a circle) that visually attracts attention is left near the coverings that are displayed by the color that differs from that of the other portion. In the text region 142*b*, the same mark and a message that "CHECK COVERINGS (FRONT COVERINGS OF BODY (RIGHT))" for prompting the user to check the coverings are displayed.

In the case where the opened coverings are closed when the condition for changing the normal mode into the consumable replacement mode is not satisfied, the state of the image forming apparatus 100 returns to the stop state in the normal mode. Accordingly, the display on the display unit 140 becomes the same as the display illustrated in FIG. 2. In the case where the coverings are closed when the condition for changing the normal mode into the consumable replacement mode is satisfied, the image forming apparatus 100 enters the consumable replacement mode. The UI screen is displayed on the display unit 140.

Figure 4:
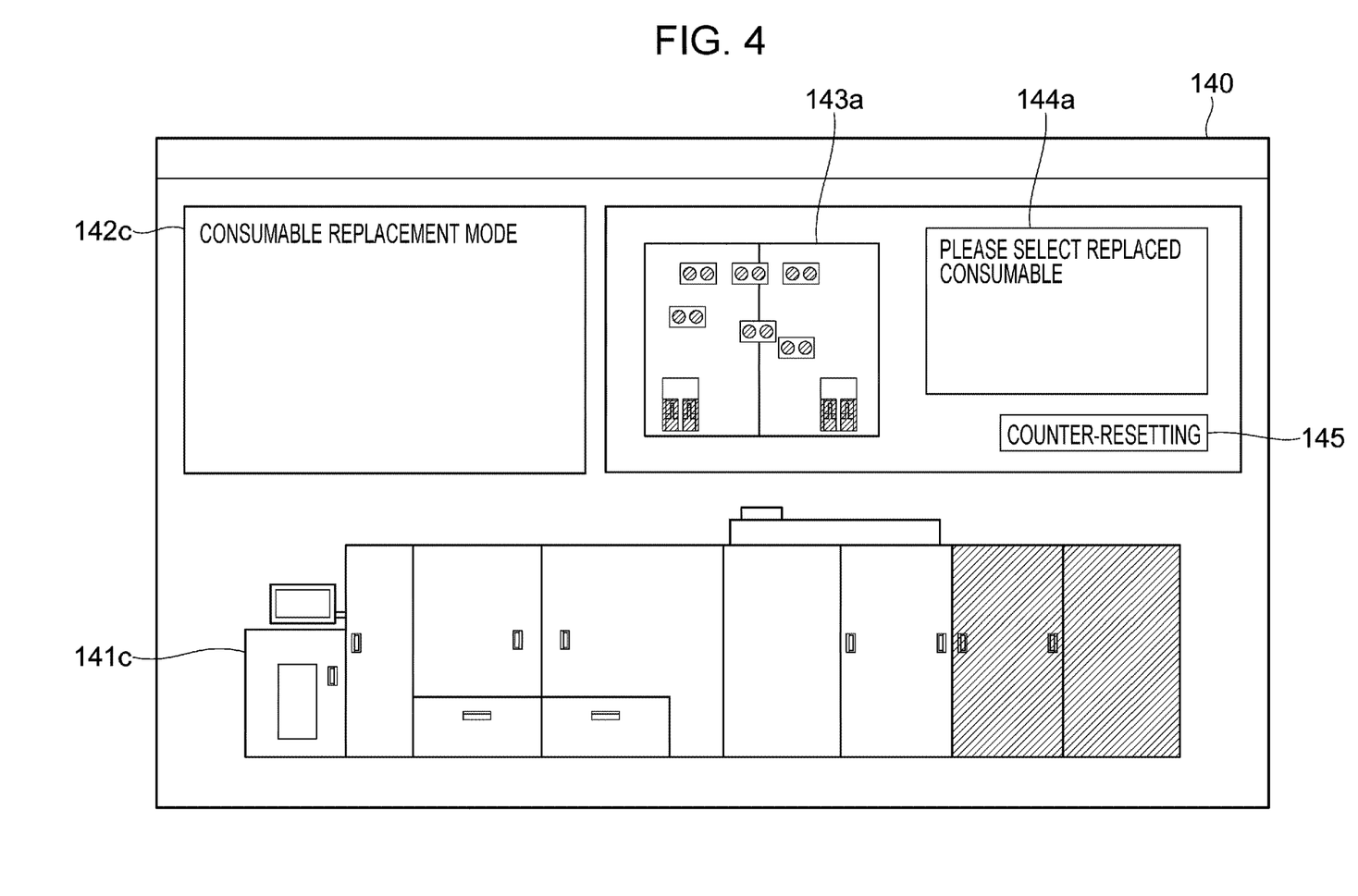
FIG. 4 illustrates an example of a UI screen in a consumable replacement mode.

FIG. 4 illustrates an example of the UI screen in the consumable replacement mode. In an example illustrated in FIG. 4, the UI screen in the case where the image forming apparatus 100 enters the consumable replacement mode in the state illustrated in FIG. 3. FIG. 4 illustrates an apparatus image 141*c* in which the positions of the opened coverings that are closed are indicated, text regions 142*c* and 144*a*, and a consumable image 143*a* in which the positions of the consumables that are installed in the housing of the image forming apparatus 100 are indicated. In the text region 142*c*, a message that "CONSUME REPLACEMENT MODE" that is one of the operation modes of the image forming apparatus 100 is displayed. In the text region 144*a*, a message that "PLEASE SELECT REPLACED CONSUMABLE" for prompting the user to select the consumable is displayed.

In the apparatus image 141*c* in the example illustrated in FIG. 4, the same coverings as the coverings that are displayed by the different color (hatching) in the example in FIG. 3 are displayed by using a color that differs from that of the other portion. On the UI screen, the coverings are displayed by using the color that differs from the color of the opened coverings on the screen for notification of the states of the opened coverings in FIG. 3 (in the figure, the coverings are displayed by using hatching that differs from that in FIG. 3). The coverings that are displayed in the different color are closed after the coverings are opened once. Accordingly, it is recognized from the display on the UI screen that there is a possibility that a consumable that is installed in an inner portion is replaced or replenished when the coverings are opened.

In the consumable image 143*a*, a situation in the housing that faces the coverings that are displayed by using the different color in the apparatus image 141*c* is displayed. In the consumable image 143*a* in which the situation in the housing is indicated, the images of the consumables are displayed positions corresponding to the actual positions of the consumables in the housing. The UI screen in the consumable replacement mode enables the operation of selecting a consumable that is displayed in the consumable image 143*a* is receivable from the user. For example, in the case where the operation unit 130 of the image forming apparatus 100 is a touch screen, the consumable is selected by touching a part of the image of the consumable (in other words, the replaced consumable) on the UI screen by the user. The operation of selecting the consumable is performed by the user, and resetting of the counter that counts the progression information about the selected consumable is prepared.

Figure 5:
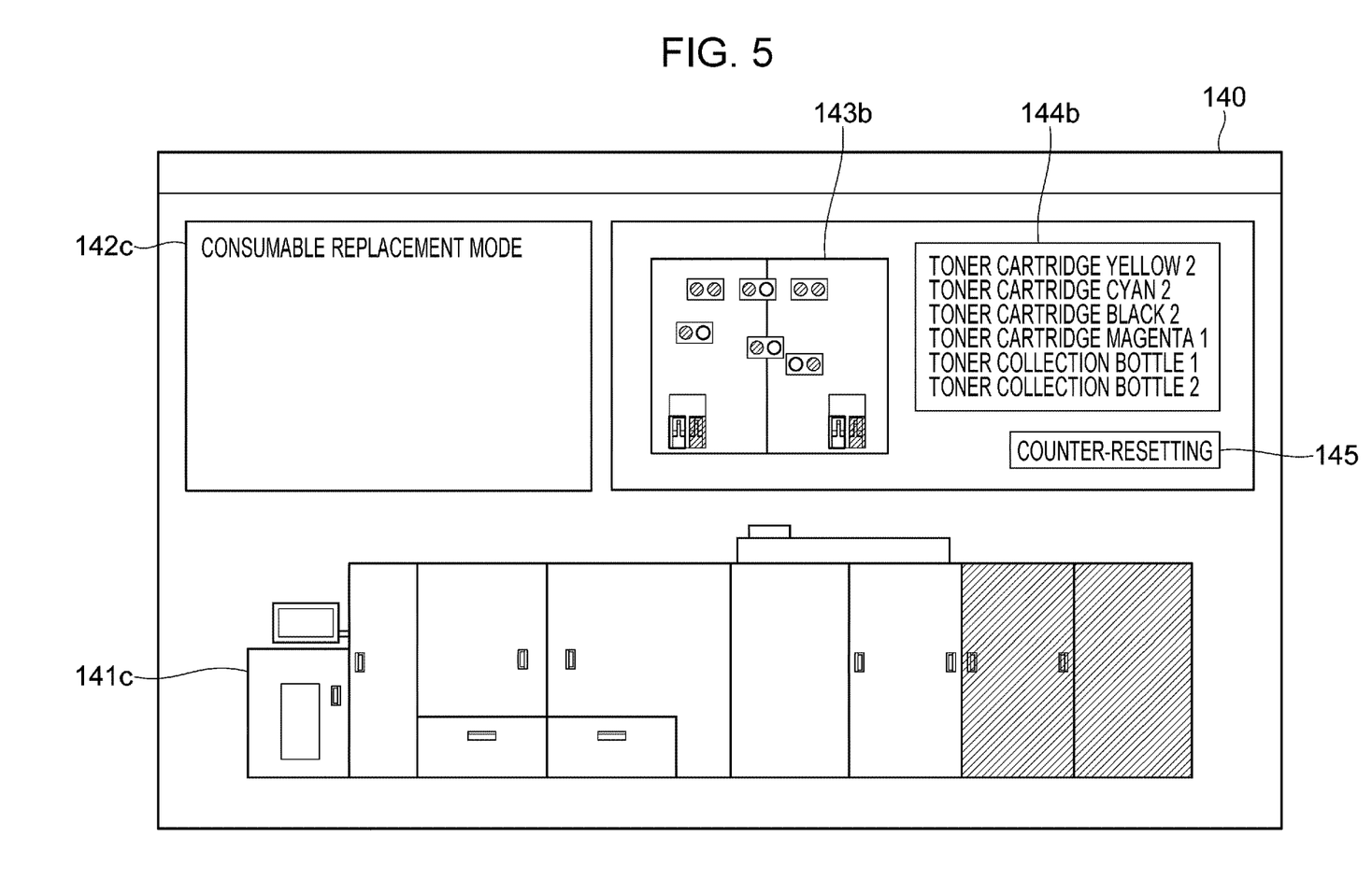
FIG. 5 illustrates an example of the UI screen in the case where an operation of selecting a consumable is performed in the consumable replacement mode.

FIG. 5 illustrates an example of the UI screen in the case where the operation of selecting the consumable is performed in the consumable replacement mode. In an example illustrated in FIG. 5, the UI screen is displayed with some consumables selected in the state illustrated in FIG. 4. In a consumable image 143*b* in FIG. 5, the selected consumables are displayed by using a color that differs from those of consumables that are not selected (in the figure, the selected consumables are displayed by using thick lines).

In a text region 144*b* on the right of the consumable image 143*b* in FIG. 5, texts that represent the names of the selected consumables are displayed. In an example illustrated FIG. 5, the consumables such as "TONER CARTRIDGE YELLOW 2" and "TONER COLLECTION BOTTLE 1" are selected. The user refers the UI screen illustrated in FIG. 5 and may visually check whether the user correctly selects the consumables, based on information about the positions of the consumables that is displayed in the apparatus image 141*c* and in the consumable image 143*b* and the names of the consumables that are displayed in the text region 144*b*. A button object 145 for resetting the counter that counts the progression information about the selected consumables is displayed below the text region 144*b* (in the figure, a text that "COUNTER-RESETTING" is displayed). The user selects the button object 145 on the UI screen, and another window (referred to as a "confirmation window") for checking whether the counter is reset is consequently displayed.

Figure 6:
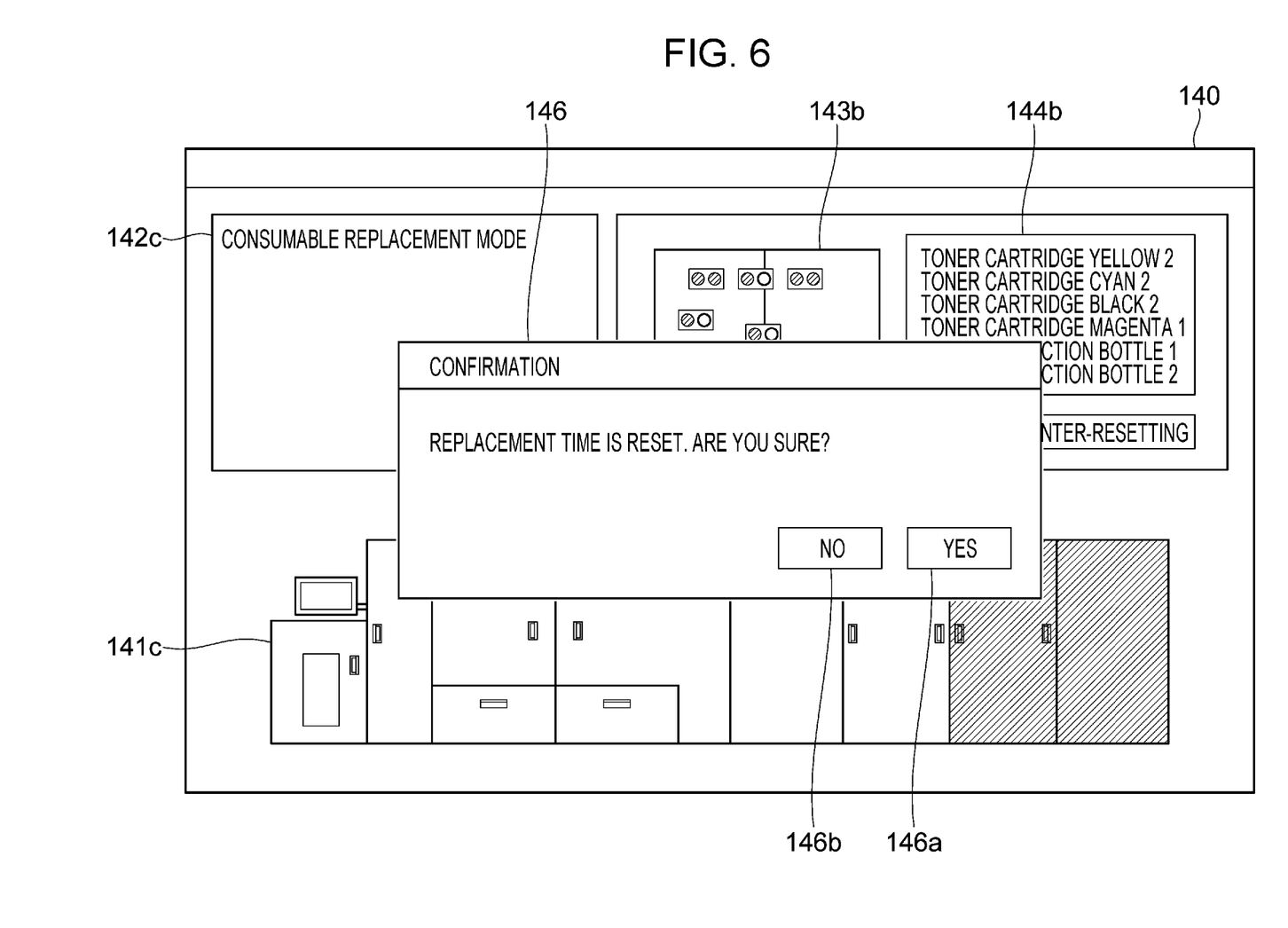
FIG. 6 illustrates a state in which a confirmation window is displayed on the UI screen in FIG. 5.

FIG. 6 illustrates a state in which the confirmation window is displayed on the UI screen in FIG. 5. In a confirmation window 146 illustrated in FIG. 6, a message text that "REPLACEMENT TIME IS RESET. ARE YOU SURE?", a button object 146*a* for resetting the counter, and a button object 146*b* for cancel are displayed. When the button object 146*a* is selected, the counter for each consumable that, is selected on the UI screen in FIG. 5 is reset. The image forming apparatus 100 enters the normal mode from the consumable replacement mode. The state of the screen on the display unit 140 returns to the state illustrated in FIG. 2. When the button object 146*b* is selected, the confirmation window 146 on the screen of the display unit 140 is closed, and the screen returns to the UI screen illustrated in FIG. 5.

Operation of Image Forming Apparatus 100

Figure 7:
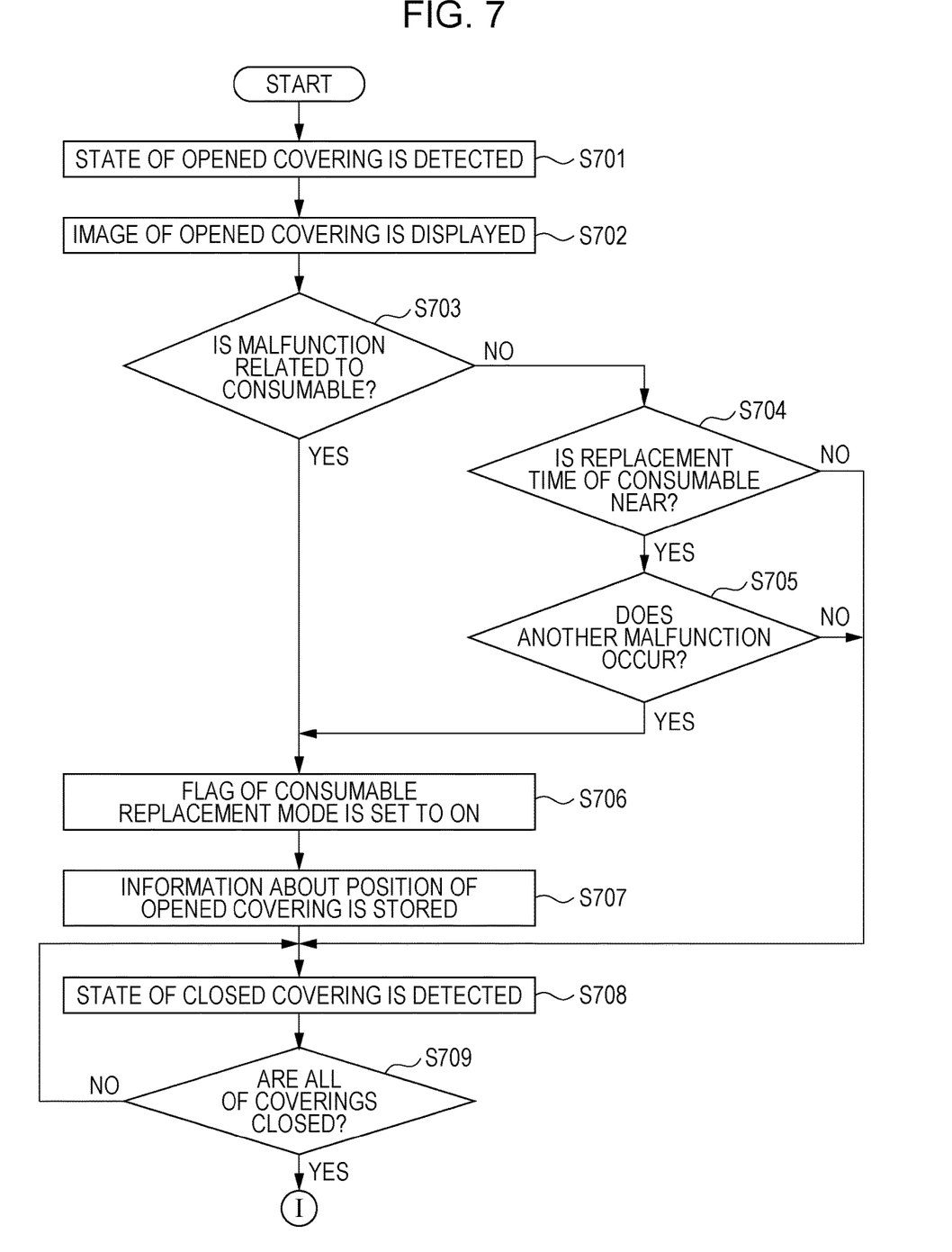
FIG. 7 is a flowchart illustrating an operation regarding the consumable replacement mode of the image forming apparatus.

FIG. 7 and FIG. 8 are flowcharts illustrating an operation regarding the consumable replacement mode of the image forming apparatus 100. When the image forming apparatus 100 malfunctions, and one of the coverings is opened, the controller 110 (see FIG. 1) detects a state of the opened covering by using signals from sensors that are disposed on the coverings (S701). The controller 110 causes the display unit 140 to display an image (see FIG. 3) of the opened covering (S702). The controller 110 determines whether the malfunction that occurs is related to any one of the consumables. Examples of the malfunction related to any one of the consumables include out of toner, out of paper, and another operation failure due to the degradation of the consumable. For example, the storage unit 120 (see FIG. 1) stores information about the malfunction related to any one of the consumables in advance, and when the occurrence of the malfunction is detected, the controller 110 refers the stored information and determines whether the malfunction is related to any one of the consumables.

If the malfunction that occurs is related to any one of the consumables (YES at S703), the controller 110 enters the consumable replacement mode, and for this purpose, the flag of the consumable replacement mode in a mode control function is set to ON (S706). The controller 110 causes a storage component such as the storage unit 120 or the RAM 112 to store information (in the figure, "INFORMATION ABOUT POSITION OF OPENED COVERING") about the opened covering (S707). The reason is as follows: it is presumed that the covering of the image forming apparatus 100 is opened for replacement of the consumable related to the malfunction.

If the malfunction that occurs is not related to the consumables (NO at S703), the controller 110 determines whether the replacement time of a consumable is near. An example of the case where the replacement time is near is the case where a difference between the progression information (a counter value) about the consumable and the replacement recommendation time that is set for the consumable is less than a redetermined threshold.

If the replacement time of a consumable is near (YES at S704), the controller 110 determines whether a malfunction (referred to as "another malfunction") other than the malfunction related to the consumable occurs. An example of the other malfunction is paper jam. Some malfunctions instead of all malfunctions other than the malfunction related to the consumable may be set as other malfunctions in advance, and whether the malfunction that occurs is any one of the other set malfunctions may be determined.

If the other malfunction does not occur (YES at S705), the controller 110 enters the consumable replacement mode, and for this purpose, the flag of the consumable replacement mode in the mode control function is set to ON (S706). The reason is as follows: it is presumed that when the replacement time of a consumable is near and when the other malfunction does not occur, the covering of the image forming apparatus 100 is opened in order to replace the consumable. The controller 110 causes the storage component such as the storage unit 120 or the RAM 112 to store the information (in the figure, "INFORMATION ABOUT POSITION OF OPENED COVERING" about the opened covering (S707).

If the malfunction that occurs is not related to the consumables (NO at S703), and the replacement time of each consumable is not near (NO at S704), it is presumed that the covering of the image forming apparatus 100 is opened in order to replace the consumable. Accordingly, the controller 110 does not enter the consumable replacement mode, and the flag of the consumable replacement mode in the mode control function is not set to ON. If the replacement time of a consumable is near (YES at S704), and any of the other malfunctions occurs (NO at S705), it is presumed that the covering of the image forming apparatus 100 is opened in order to correct the other malfunction that occurs. Accordingly, the controller 110 does not enter the consumable replacement mode, and the flag of the consumable replacement mode in the mode control function is not set to ON.

Subsequently, the covering that is opened at S701 is closed, the controller 110 detects a state of the closed covering by using signals from the sensors that are disposed on the coverings (S708), and whether all of the coverings of the image forming apparatus 100 are closed is determined. If at least a covering remains opened (NO at S709), the covering remains opened, which corresponds to a malfunction, and a process at S708 is performed again.

If ail of the coverings are closed (YES at S709), the controller 110 determines whether the flag of the consumable replacement mode is ON. If the flag is OFF (NO at S710), no operations in the consumable replacement mode are performed, and the image (see FIG. 2) in the normal mode is displayed on the display unit 140 (S720).

If the flag of the consumable replacement mode is ON (YES at S710), the controller 110 enters the consumable replacement mode (S711), and the display unit 140 displays the UI screen (see FIG. 4) in the consumable replacement mode (S712). When the user selects the consumable on the UI screen and performs the reset operation (YES at S713), the controller 110 resets the counter of the selected consumable (S714). In the example described with reference to FIG. 4 to FIG. 6, an example of the reset operation is an operation of selecting the button object 145 in FIG. 5 and selecting the button object 146a in FIG. 6.

Figure 8:
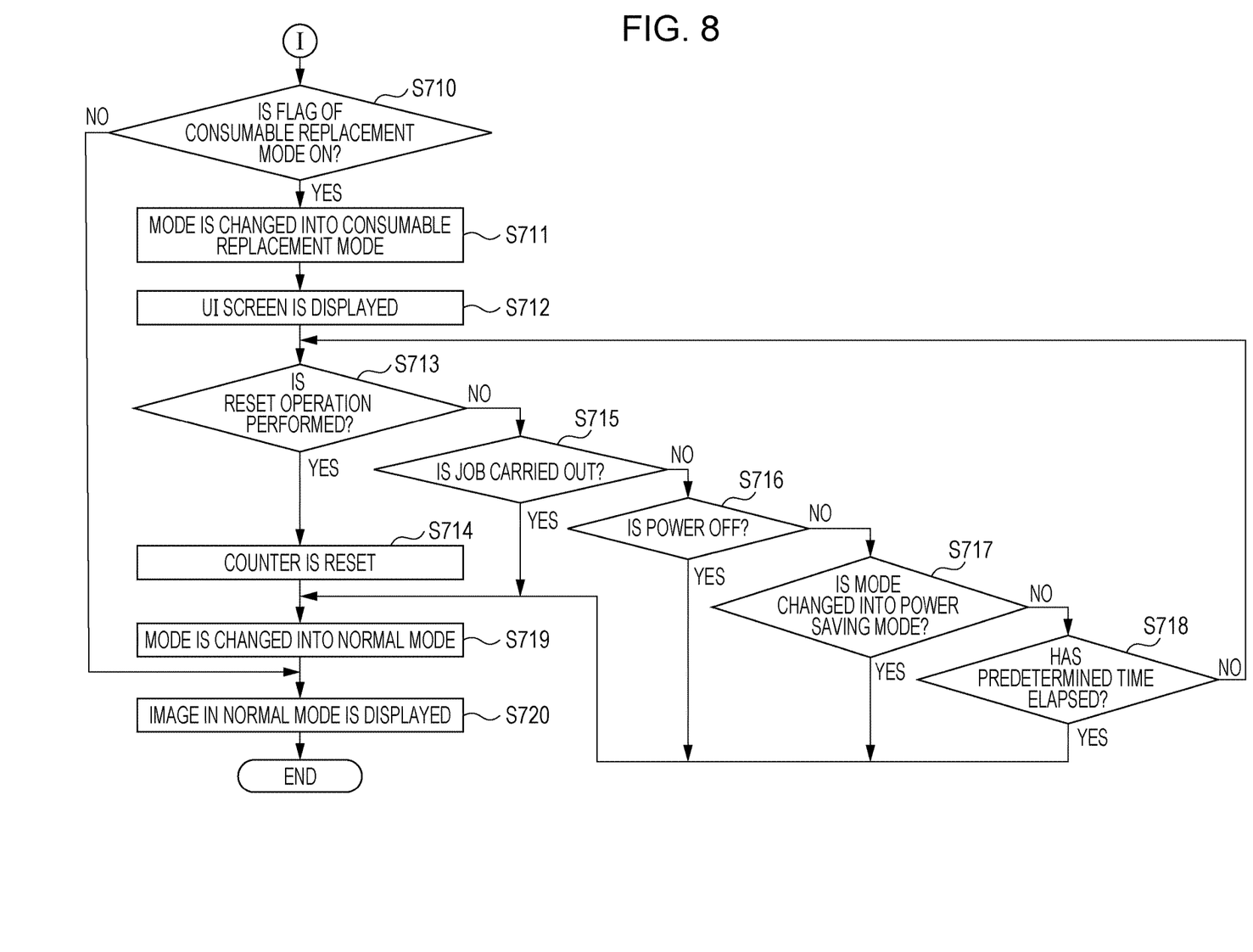
FIG. 8 is a flowchart illustrating the operation regarding the consumable replacement mode of the image forming apparatus.

The controller 110 resets the counter of the selected consumable and subsequently changes the operation mode of the image forming apparatus 100 into the normal mode (S719). The controller 110 causes the display unit 140 to display the image (see FIG. 2) in the normal mode (S720).

After the display unit 140 displays the UI screen, the controller 110 waits the reset operation of the counter described above and determines whether phenomena that are set as the trigger for the end of the consumable replacement mode occur. In the description, the phenomena to be detected are four phenomena: a job that is to be carried out in the normal mode is carried out, the image forming apparatus 100 is powered off, the image forming apparatus 100 enters the power saving mode, and a predetermined time has elapsed. If any one of these phenomena is detected (YES at any one of S715 to S718), the controller 110 enters the normal mode (S719), and the display unit 140 displays the image (see FIG. 2) in the normal mode (S720). If none of these phenomena is detected (NO at S715 to S718), the controller 110 waits for the reset operation or the detection of any one of the phenomena. After the predetermined time has elapsed, which corresponds to YES at S718, the controller 110 enters the normal mode, and the image in the normal mode is displayed (S719 and S720).

Operation without Resetting Counter

It is thought that the counter of a consumable that is specified on the UI screen in the consumable replacement mode is not reset, although the mode returns to the normal mode. An example thereof is the case where any one of the phenomena at S715 to S718 in FIG. 8 occurs, and the mode is consequently changed into the normal mode. In this case, there is a possibility that the counter to be reset is not reset. In view of this, the controller 110 may enter the normal mode in response to the occurrence of the phenomenon and may notify the user of the fact that the reset operation of the counter is not received with an appropriate timing, for example, when the image forming apparatus 100 carries out a next job in the case where the UI screen in the consumable replacement mode is cleared. Specifically, the notification may be transmitted after the job is carried out at S715, when a next carried out, when the image forming apparatus 100 starts up after the power is turned off at S716, or when the image forming apparatus 100 that enters the power saving mode at S717 enters the normal mode again. The notification may be periodically transmitted after the predetermined time has elapsed at S718. For example, the user is notified by displaying a message on the display unit 140. At this time, an image in which the position of the target consumable is indicated may be displayed on the display unit 140 in addition to the message as in the UI screen in the consumable replacement mode illustrated in FIG. 5 and FIG. 6. In response to the notification, the user may operate the operation unit 130 of the image forming apparatus 100 such that the display unit 140 displays the UI screen in the consumable replacement mode for the reset operation of the counter.

The exemplary embodiment of the present disclosure will be described above. However, the technical scope of the present disclosure is not limited to the exemplary embodiment described above. For example, according to the exemplary embodiment described above, as for the image (see FIG. 3) in which the opened coverings are indicated, the opened coverings are displayed by using the color that differs from that of the other portion in the apparatus image. Similarly, on the UI screen (see FIG. 4), the portion at the position of each consumable the counter of which is to be reset is displayed by using the color that differs from that of the other portion. On the UI screen, each selected consumable the counter of which is to be reset is displayed by using the color that differs from those of the other consumables. These display formats are not limited to the use of the different colors as described above, provided that the position of each opened covering, the position of each consumable, and each selected consumable are recognizable. For example, a covering or a consumable to be recognized may have brightness or contrast that differs from that of the other portion.

According to the embodiment described above, in the case where another malfunction occurs, the mode is not changed into the consumable replacement mode even when a covering of the housing of the image forming apparatus 100 is opened and closed and when the replacement time of a consumable is near. However, the mode may be changed into the consumable replacement mode regardless of the presence or absence of the other malfunction when the covering is closed and when the replacement time of a consumable is near. Various other modifications and alterations are included in the present disclosure without departing from the technical scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
    detect presence or absence of a malfunction and opening and closing of a covering; and
    cause a display device to display information about a consumable such that a reset operation of a counter that is set regarding the consumable is receivable in a case where a predetermined malfunction does not occur, and a covering related to the consumable is opened and is subsequently closed, and
    cause the display device not to display the information about the consumable such that the reset operation of the counter that is set regarding the consumable is not receivable in a case where the predetermined malfunction occurs, and the covering related to the consumable is opened and is subsequently closed.

2. The image forming apparatus according to claim 1, wherein the processor is configured to cause the display device to display different screens between a case where the opened covering is closed when a predetermined condition regarding the consumable is satisfied and a case where the covering is closed when the condition is not satisfied.

3. The image forming apparatus according to claim 2, wherein the processor is configured to:
    cause the display device to display information about the opened covering in response to the opening and closing of the covering;
    cause the display device to display the information about the consumable in a case where the covering is closed when the condition is satisfied; and
    cause the display device to dismiss a display of the information about the opened covering in a case where the covering is closed when the condition is not satisfied.

4. The image forming apparatus according to claim 2, wherein the condition is a condition regarding a replacement time of the consumable that is calculated by using a method that is determined for the consumable.

5. The image forming apparatus according to claim 1, wherein the processor is configured to cause the display device to dismiss a display of the information about the consumable in a case where a predetermined phenomenon occurs with the display device displaying the information about the consumable.

6. The image forming apparatus according to claim 5, wherein the processor is configured to notify a user of a fact that the reset operation of the counter is not received when a next image formation process is performed in a case where the display of the information about the consumable is dismissed due to occurrence of the phenomenon.

7. An image forming apparatus comprising:
a processor configured to:
    cause a display device to display an operation screen and receive an operation of a user by using the operation screen;
    cause, in a first operation mode, the display device to display an image in which a position of a covering of the image forming apparatus that is opened and closed is indicated by a display format different from a display format by which a position of a covering of the image forming apparatus that is not opened and closed is indicated; and
    cause, in a second operation mode, the display device to display an image in which the position of the covering of the image forming apparatus that is opened and closed and a position of a consumable corresponding to the position of the covering of the image forming apparatus that is opened and closed are indicated by a display format different from a display format by which the position of the covering of the image forming apparatus that is not opened and closed and a position of a consumable corresponding to the position of the covering of the image forming apparatus that is not opened and closed are indicated such that a reset operation of a counter that is set regarding the consumable that is specified in the image is receivable.

8. The image forming apparatus according to claim 7, wherein the processor is configured to enter the second operation mode from the first operation mode in a case where the opened covering is closed when a predetermined condition is satisfied.

9. The image forming apparatus according to claim 8, wherein the condition is that a predetermined malfunction of the image forming apparatus does not occur and that a replacement time of the consumable that is calculated by using a method that is determined for the consumable comes.

10. The image forming apparatus according to claim 7, wherein the processor is configured to enter the first operation mode in a case where a predetermined phenomenon occurs in the second operation mode and even in a case where the reset operation of the counter is not received.

11. The image forming apparatus according to claim 10, wherein the processor is configured to notify the user of a fact that the reset operation of the counter is not received when a next image formation process is performed in a case where the processor enters the first operation mode due to occurrence of the phenomenon.

12. The image forming apparatus according to claim 10, wherein the phenomenon is that an instruction for performing a process that is to be performed in the first operation mode is transmitted.

13. The image forming apparatus according to claim 10, wherein the phenomenon is that the image forming apparatus is powered off.

14. The image forming apparatus according to claim 10, wherein the phenomenon is that the image forming apparatus enters a power saving mode.

15. The image forming apparatus according to claim 10, wherein the phenomenon is that the image forming apparatus is not operated, and a predetermined time has elapsed.

16. A non-transitory computer readable medium storing a program causing a computer to execute a process comprising:

causing a display device to display an operation screen and receiving an operation of a user by using the operation screen;

causing, in a first operation mode, the display device to display an image in which a position of a covering of the image forming apparatus that is opened and closed is indicated by a display format being different from a display format by which a position of a covering of the image forming apparatus that is not opened and closed is indicated;

causing, in a second operation mode, the display device to display an image in which the position of the covering of the image forming apparatus that is opened and closed and a position of a consumable corresponding to the position of the covering of the image forming apparatus that is opened and closed are indicated by a display format being different from a display format by which the position of the covering of the image forming apparatus that is not opened and closed and a position of a consumable corresponding to the position of the covering of the image forming apparatus that is not opened and closed are indicated; and receiving a reset operation of a counter that is set regarding the consumable that is specified in the image.

* * * * *